United States Patent
Birkheim

(10) Patent No.: US 8,857,923 B2
(45) Date of Patent: Oct. 14, 2014

(54) BRAKE SYSTEM FOR A VEHICLE

(75) Inventor: Andreas Birkheim, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 13/199,215

(22) Filed: Aug. 22, 2011

(65) Prior Publication Data

US 2012/0061192 A1    Mar. 15, 2012

(30) Foreign Application Priority Data

Sep. 10, 2010  (DE) .......................... 10 2010 040 577

(51) Int. Cl.
| | | |
|---|---|---|
| *B60T 13/68* | (2006.01) | |
| *B60T 8/44* | (2006.01) | |
| *B60T 13/66* | (2006.01) | |
| *B60T 13/14* | (2006.01) | |
| *B60T 8/40* | (2006.01) | |

(52) U.S. Cl.
CPC ............... *B60T 13/145* (2013.01); *B60T 8/446* (2013.01); *B60T 13/662* (2013.01); *B60T 13/686* (2013.01); *B60T 8/4018* (2013.01)
USPC ......................... 303/114.1; 303/116.1; 303/11

(58) Field of Classification Search
USPC ......... 303/10, 11, 113.1, 114.1, 114.2, 116.1, 303/DIG. 10
See application file for complete search history.

(56) References Cited

U.S. PATENT DOCUMENTS

| | | | | |
|---|---|---|---|---|
| 4,415,210 A | * | 11/1983 | Belart et al. ............... | 303/114.1 |
| 4,634,190 A | * | 1/1987 | Wupper .................. | 303/114.1 |
| 4,641,894 A | * | 2/1987 | Belart ........................ | 303/114.1 |
| 4,703,978 A | * | 11/1987 | Belart et al. ............... | 303/114.1 |
| 7,290,841 B2 | * | 11/2007 | Isono ......................... | 303/114.1 |
| 7,311,365 B2 | * | 12/2007 | Nohira ....................... | 303/119.1 |

FOREIGN PATENT DOCUMENTS

| | | |
|---|---|---|
| DE | 103 18 850 | 11/2004 |
| DE | 10 2004 025 638 | 9/2005 |

* cited by examiner

*Primary Examiner* — Thomas J Williams
(74) *Attorney, Agent, or Firm* — Kenyon & Kenyon LLP

(57) ABSTRACT

A brake system for a vehicle includes a main brake cylinder which has a first chamber which is hydraulically connected to at least one wheel brake cylinder for braking a wheel of the vehicle; an activating device for the driver to mechanically act on a piston of the main brake cylinder in order to pressurize hydraulic fluid in the first chamber of the main brake cylinder; and a pressure generating device which is hydraulically connected to the first chamber of the main brake cylinder, and which for activating the wheel brake cylinder supplies the wheel brake cylinder with hydraulic fluid through the first chamber of the main brake cylinder.

3 Claims, 6 Drawing Sheets

BRAKE SYSTEM FOR A VEHICLE

BACKGROUND OF THE INVENTION

1. Field of the Invention

The present invention relates to a brake system for a vehicle.

2. Description of Related Art

For vehicle brake systems, a basic distinction is made between so-called nonmuscular energy brake systems and power-assisted brake systems.

In nonmuscular energy brake systems, the main brake cylinder, which is hydraulically connected to the wheel brake cylinders, is activated without direct transmission of the force from the driver's foot to the main brake cylinder in order for the wheel brake cylinder to be acted upon by hydraulic fluid. Such a nonmuscular energy brake system is described in published German patent application document DE 10 2004 025 638 A1, for example.

In contrast, in power-assisted brake systems a brake booster is used which, in addition to the force from the driver's foot, acts upon the main brake cylinder in order for the wheel brake cylinder to be acted upon by hydraulic fluid. Such a power-assisted brake system is described in published German patent application document DE 103 18 850 A1, for example.

BRIEF SUMMARY OF THE INVENTION

Compared to conventional approaches, the brake system according to the present invention offers the advantage that for normal braking operations, the pressure generating device provides the necessary hydraulic fluid to the wheel brake cylinders, essentially independently of the force from the driver's foot. Only for highly dynamic braking operations does the driver initially provide the necessary hydraulic fluid to the wheel brake cylinders via the force from his foot, until the pressure generating device has overcome its inertia, and thereafter the pressure generating device once again provides the necessary hydraulic fluid to the wheel brake cylinders, essentially independently of the force from the driver's foot. "Highly dynamic braking operations" means braking operations in which a very high braking torque is required within a very short time period.

In addition, in the approach according to the present invention no pedal simulator is necessary for conveying to the driver the typical feel of braking to his foot, since the driver is in continuous mechanical connection with the piston of the main brake cylinder.

Thus, the approach according to the present invention combines the advantages of a nonmuscular energy brake system with those of a power-assisted brake system.

DETAILED DESCRIPTION OF THE INVENTION

Figure 1:
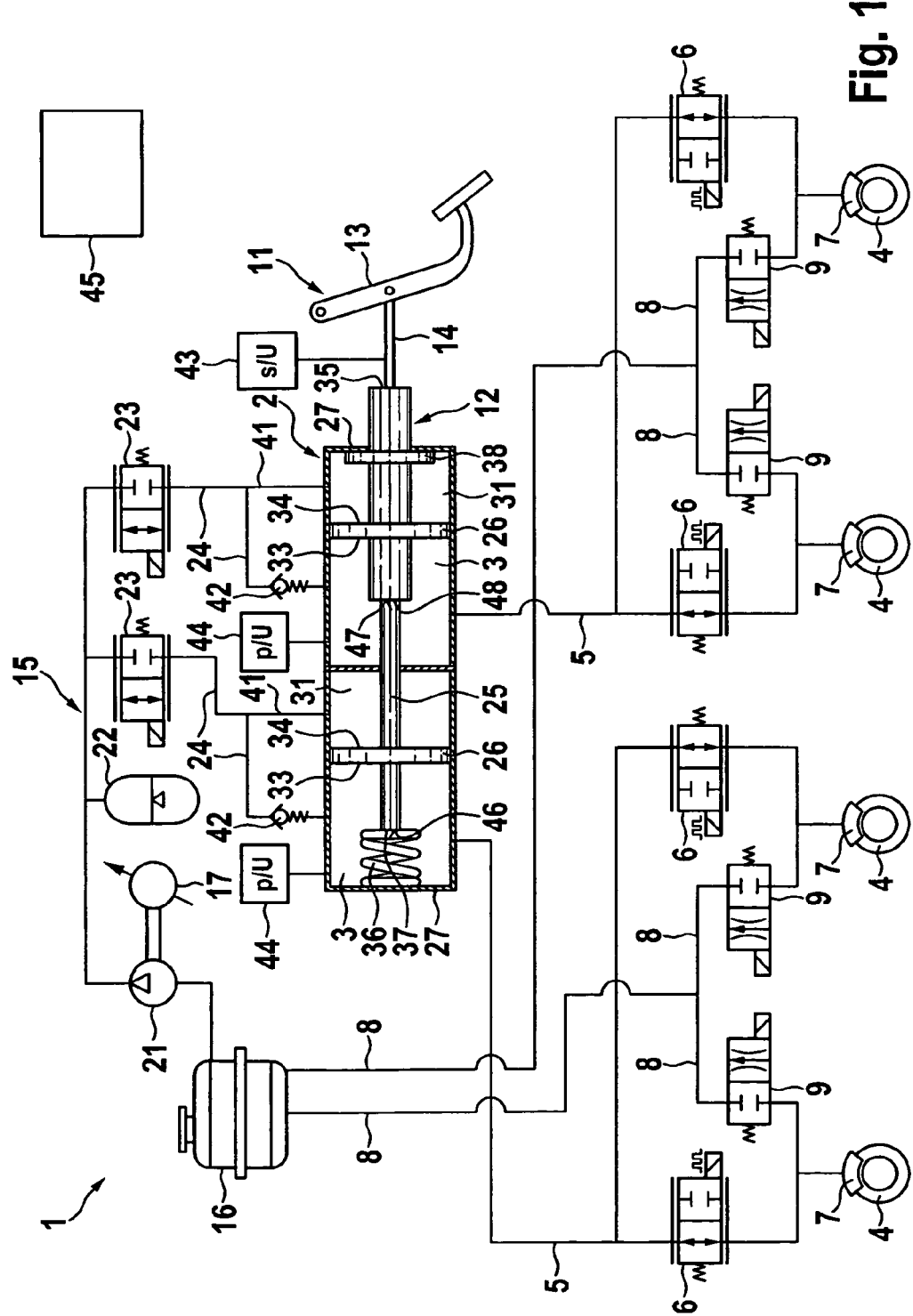
FIG. 1 schematically shows a brake system according to one exemplary embodiment of the present invention.

Unless stated otherwise, identical or functionally equivalent elements are denoted by the same reference numerals in the figures.

FIG. 1 schematically shows a brake system 1 according to one exemplary embodiment of the present invention.

Brake system 1 is preferably used in a motor vehicle, not illustrated in greater detail.

Brake system 1 has a main brake cylinder 2 having two first chambers 3, each of which is hydraulically connected via lines 5 to two wheel brake cylinders 7 for braking wheels 4 of the motor vehicle. Each line 5 is connected to a wheel brake cylinder 7 via an inlet valve 6. Inlet valves 6 may be designed as 2/2-way valves which are open in the absence of current. Each of lines 5 may have a branched design in order to supply two wheel brake cylinders 7 with hydraulic fluid. In addition, wheel brake cylinders 7 are each hydraulically connected to a tank 16 via a line 8 and an outlet valve 9. Outlet valves 9 may be designed as 2/2-way valves which are closed in the absence of current. The pressure present at wheel brake cylinders 7, and therefore the generated braking torque, is controlled with the aid of inlet valves and outlet valves 6, 9, respectively.

Brake system 1 also has an activating device 11 for the driver to mechanically act upon a piston 12 of main brake cylinder 2 in order to pressurize hydraulic fluid in first chambers 3 of main brake cylinder 2. Activating device 11 may be composed, for example, of a pedal 13 and a pedal rod 14 which mechanically connects the pedal to piston 12.

In addition, brake system 1 has a pressure generating device 15 which is hydraulically connected to first chambers 3 of main brake cylinder 2, and for activating wheel brake cylinders 7 it supplies same with hydraulic fluid through first chambers 3 of main brake cylinder 2. Pressure generating device 15 may have tank 16, a pump 21 which is driven by an electric motor 17, for example, a pressure accumulator 22, and two control valves 23. Pump 21 charges pressure accumulator 22 with hydraulic fluid from tank 16. Each of control valves 23, which are closed in the absence of current, supplies hydraulic fluid to a respective first chamber 3 via a line 24.

Piston 12 of main brake cylinder 2 has two separating elements 26 which are fixedly connected to a rod element 25 of piston 12. Each separating element 26 subdivides a closed cylinder housing 27 into a first chamber 3 and a second chamber 31; i.e., each separating element 26 at its one side 33 delimits first chamber 3, and at its other side 34 delimits second chamber 31. In the present case, sides 33 and 34 are designed as annular surfaces. Only rod element 25, which is connected at its end 35 to pedal rod 14, passes through closed cylinder housings 27. Also provided is a compression spring 36 which is situated between cylinder housing 27 and other end 37 of rod element 25. In addition, at its other end, rod element 25 has a stop 38 which delimits a motion of rod element 25 in one direction (to the right in FIG. 1), resulting in an increase in the volumes in first chambers 3.

For the sake of simplicity, unless stated otherwise the following discussion concerns only the left brake circuit in FIG. 1, which in particular includes the two left wheel brake cylinders 7, but is equally applicable to the right brake circuit in FIG. 1, which in particular includes the two right wheel brake cylinders 7.

Pressure generating device 15 is also hydraulically connected to second chamber 31. For this purpose, a line 41 which leads to second chamber 31 branches off from line 24.

A valve 42 is situated in line 24 which prevents the flow of hydraulic fluid from first chamber 3 into second chamber 31. Valve 42 is designed as a check valve, for example.

In addition, brake system 1 has a sensor 43, which is a path sensor, for example, for detecting a driver braking signal, and has a sensor 44 for detecting the pressure in first chamber 44. Sensors 43 and 44, as well as electric motor 17, pump 21, control valves 23, inlet valves 6, and outlet valves 8, have signal connections with an electronic control/evaluation unit 45 (also known as an electronic control unit) of brake system 1.

The mode of operation of brake system 1 is explained below:

During normal braking operations, sensor 43 detects a driver braking input by detecting the position of pedal 13, whereupon control/evaluation unit 45 opens control valves 23. This causes hydraulic fluid to flow from pressure accumulator 22, through first chamber 3, and into wheel brake cylinder 7 essentially independently of the force from the driver's foot, thus braking the motor vehicle. Control/evaluation unit 45 also controls control valves 23 as a function of the pressure in first chamber 3 which is detected by sensor 44. For extended braking operations, pump 21 may also directly supply hydraulic fluid to first chambers 3, i.e., wheel brake cylinders 7, to prevent pressure accumulator 22 from being completely emptied.

Such a normal braking operation may also be triggered by control/evaluation unit 45 itself without driver braking input. This may be carried out, for example, in a mode for regulating the driving dynamics (electronic stability program, or ESP for short) and/or a mode for regulating the distance from a preceding vehicle, or the like.

In addition, brake system 1 may reduce the pressure present at wheel brake cylinders 7, contrary to a driver braking input, for example by appropriately controlling pressure generating device 15. This may be the case in an antiblocking mode (ABS mode for short), for example.

The pedal force applied by the driver acts against the pressure acting on circular area 46 at other end 37 of pedal rod 25 inside first chamber 3, which is on the left in FIG. 1. In addition, the pedal force acts against a pressure acting on an annular surface 47 of a shoulder 48 in pedal rod 25 inside first chamber 3, which is on the right in FIG. 1. In this way the typical feel of braking may be easily conveyed to the driver. This may also be adjusted by appropriate dimensioning of circular area 46 and/or annular surface 47. For the normal braking operations mentioned, the pressure applied by the driver to the particular wheel cylinders 7 via circular area 46 and annular surface 47 is very small compared to the pressure applied by pressure generating device 15.

It is pointed out that due to lines 24 and 41, the same pressure is present at annular surfaces 33 and 34 of separating element 26, and therefore even a high pressure in first chamber 3 has no significant effect on the foot of the driver.

On the other hand, for a highly dynamic braking operation, control valves 23 are not able to open quickly enough to supply a sufficient volume of hydraulic fluid to wheel brake cylinders 7, in particular due to long signal propagation times from sensors 43 and 44 to control/evaluation unit 45, as well as the inertia of pressure generating device 15. In this case the driver, via the force from his foot, initially provides the necessary hydraulic fluid to wheel brake cylinders 7. This causes valve 42 to close, so that hydraulic fluid is not able to flow from first chamber 3 into second chamber 31 and/or back into pressure generating device 15. The driver then acts on the hydraulic fluid, via annular surface 33 and circular area 46, to provide the necessary pressure at wheel brake cylinders 7 (left brake circuit in FIG. 1). Similarly, in the brake circuit illustrated on the right in FIG. 1, the driver acts on the hydraulic fluid via annular surfaces 33 and 47.

As soon as the corresponding signal propagation times have elapsed and pressure generating device 15 has overcome its inertia, pressure generating device 15 provides the necessary hydraulic fluid to wheel brake cylinders 7, essentially independently of the force from the driver's foot, as described above.

Because pressure generating device 15 includes an outlet in the form of a control valve 23 for each brake circuit, in the event that one of sensors 44 detects a leak in one of the two brake circuits the defective brake circuit is blocked by closing appropriate control valve 23, so that a boosted brake circuit continues to be available to the driver.

In the event that the vehicle electrical system fails, control valves 23 are closed, so that pressure generating device 15 is then hydraulically separated from chambers 3 of main cylinder 2. In this case, the driver acts on the hydraulic fluid in first chambers 3, via pedal 13 and piston 12, in order to provide the necessary pressure at wheel brake cylinders 7, as described above for the highly dynamic braking operation.

Brake system 1 is particularly suited for use in an electric vehicle or hybrid vehicle, for which additional components do not have to be provided. For example, one of the two brake circuits may be connected to an axle which is braked by the electric motor. The transition between the types of braking, i.e., braking with and without recuperation, and the associated changes in brake pressure (blending), for example, is provided independently of the driver with the aid of control valves 23 and inlet valves and/or outlet valves 6, 9, respectively.

Figure 2:
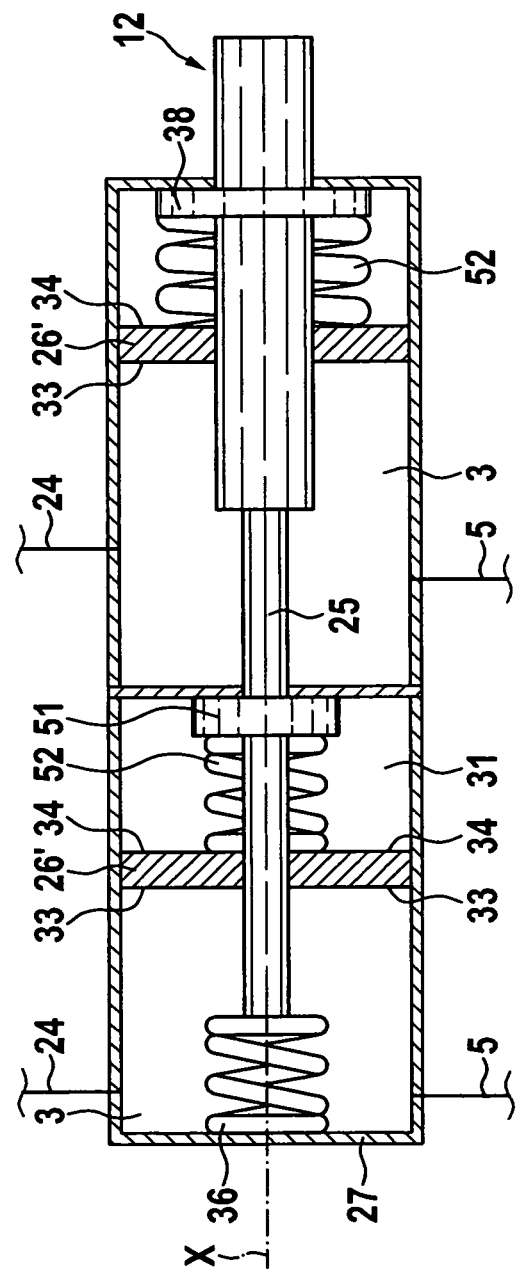
FIG. 2 schematically shows an alternative embodiment of the main brake cylinder compared to FIG. 1.

FIG. 2 schematically shows an alternative embodiment of main brake cylinder 2 compared to FIG. 1.

In contrast to the exemplary embodiment according to FIG. 1, in the exemplary embodiment according to FIG. 2 separating element 26' is suspended in a floating manner on rod element 25. This means that separating element 26' is able to move along rod element 25 in axial direction X. Thus, it is not necessary for second chamber 31 to be hydraulically connected to pressure generating device 15 in order to equalize the pressure between first chamber 3 and second chamber 31. Second chamber 31 is filled with hydraulic fluid. A compression spring 52 is situated between a shoulder 51, integrally molded onto rod element 25, and/or stop 38, and separating element 26'.

For the case of highly dynamic braking, the driver presses on separating element 26' via shoulder 51 and compression spring 52, thus pressurizing the hydraulic fluid in first chamber 3, which is on the left in FIG. 2. Similarly, the driver presses on separating element 26' via stop 38 and compression spring 52, thus pressurizing the hydraulic fluid in first chamber 3, which is on the right in FIG. 2.

In other respects, the exemplary embodiments according to FIG. 1 and FIG. 2 are the same.

Figure 3:
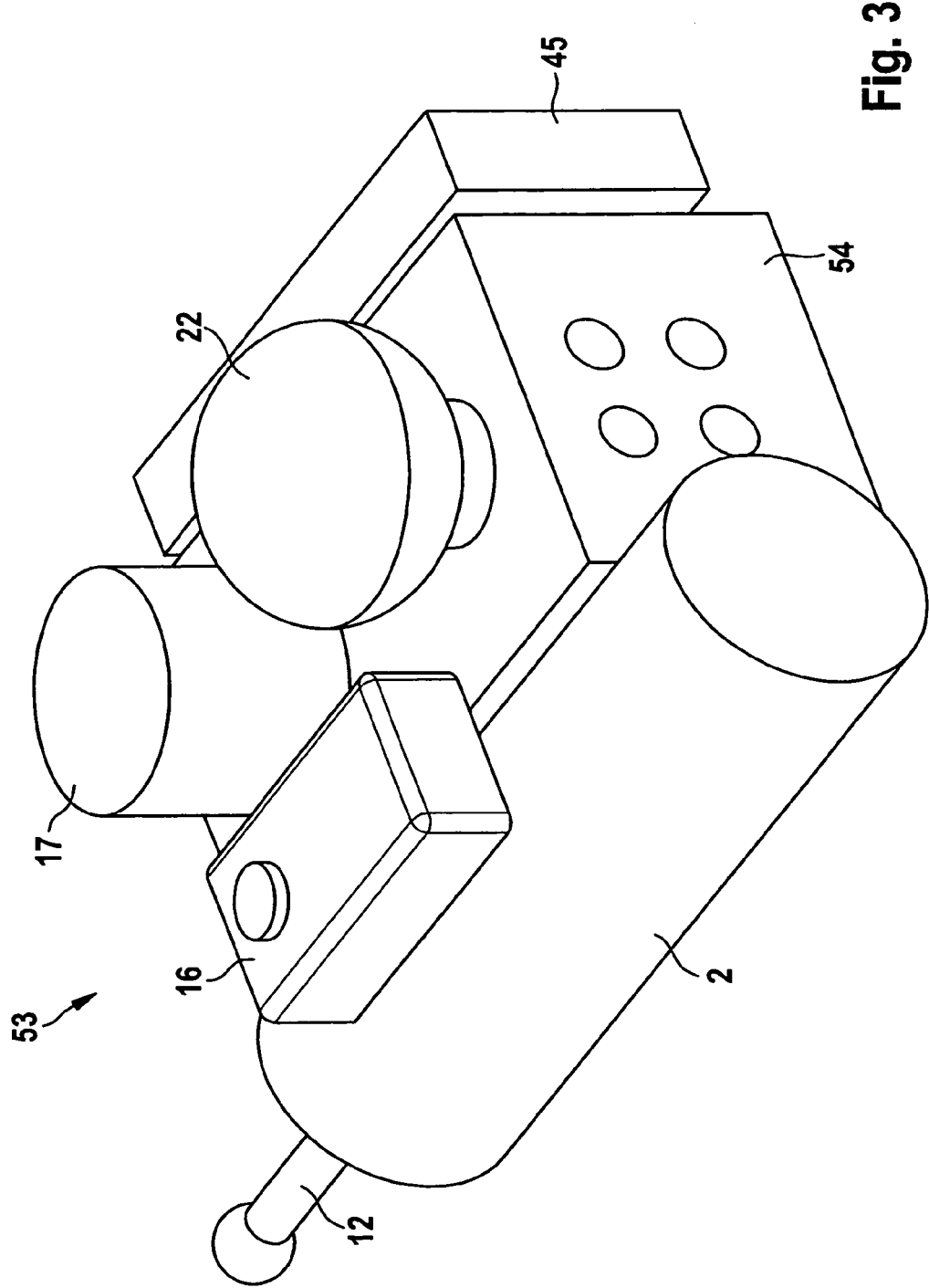
FIG. 3 shows a perspective view of components from FIG. 1 which are combined into a manageable unit.

FIG. 3 shows a perspective view of components from FIG. 1 which are combined into a manageable unit 53.

Manageable unit 53 includes, for example, main brake cylinder 2, tank 16, electric motor 17, pressure accumulator 22, control/evaluation unit 45, and a modulation block 54. Pump 21 and control valves 23 (not illustrated in FIG. 3) in particular are integrated into the modulation block, which is made of aluminum, for example. Referenced components 2, 16, 17, 22, 45, 54 are securely attached to one another.

Such a unit 53 may be easily picked up by one person and inserted into the motor vehicle for installation at that location.

Figure 4:
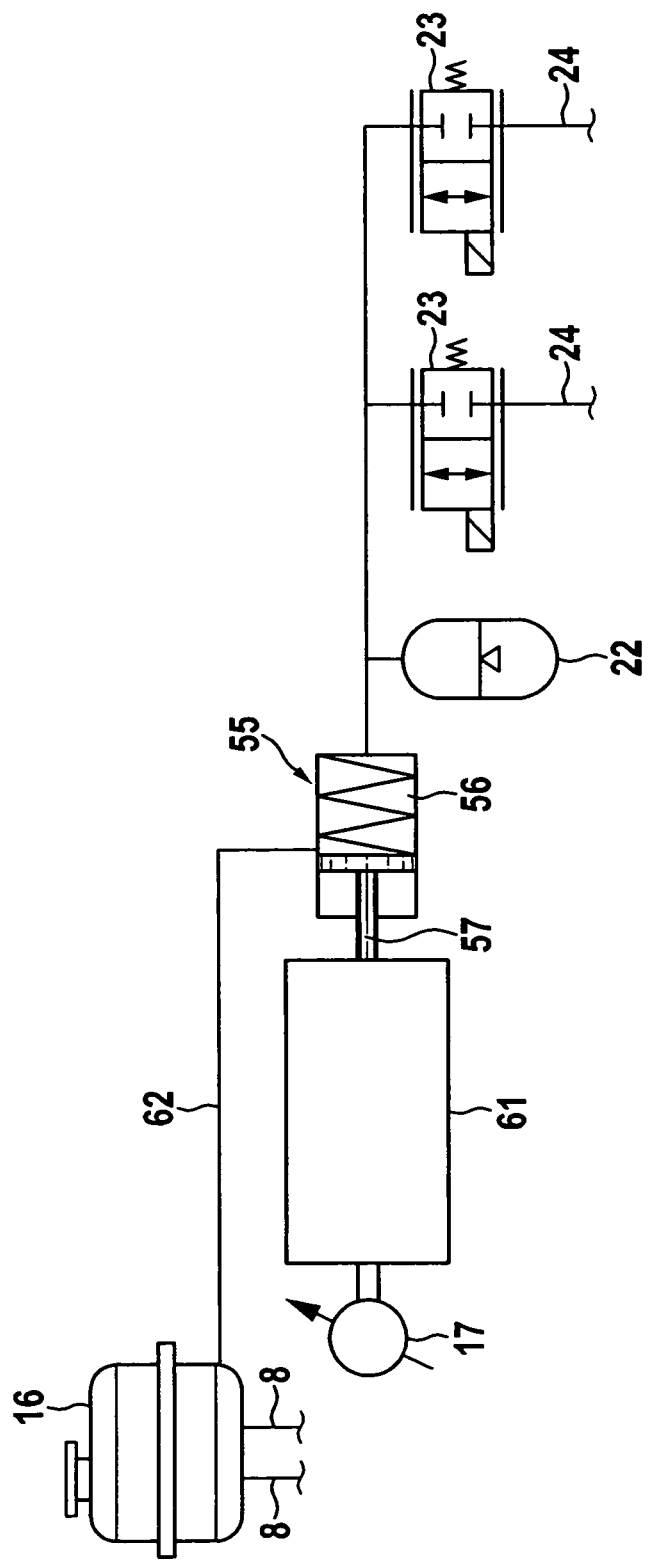
FIG. 4 schematically shows an alternative embodiment of the pressure generating device compared to FIG. 1.

FIG. 4 shows an alternative embodiment of pressure generating device 15 compared to FIG. 1.

Instead of pump 21 in FIG. 1, in the exemplary embodiment according to FIG. 4 a pump in the form of a pressure cylinder 55 (also referred to as a plunger) is used, a chamber 56 of pressure cylinder 55 being hydraulically connected to pressure accumulator 22 and to control valves 23. Hydraulic fluid is delimited in chamber 56 by a piston 57, and is pressurized by activating the piston. Piston 57 is activated with the aid of a device 61 which converts the rotational motion of electric motor 17 into a translational motion. Chamber 56 is connected to tank 16 via a sniffing line 62. When the hydraulic fluid in chamber 56 is depleted during long acting times in which brake system 1 operates in an ABS mode, piston 57 is retracted and chamber 56 is refilled with hydraulic fluid from tank 16 via sniffing line 62.

In other respects, the exemplary embodiments according to FIG. 1 and FIG. 4 are the same.

Figure 5:
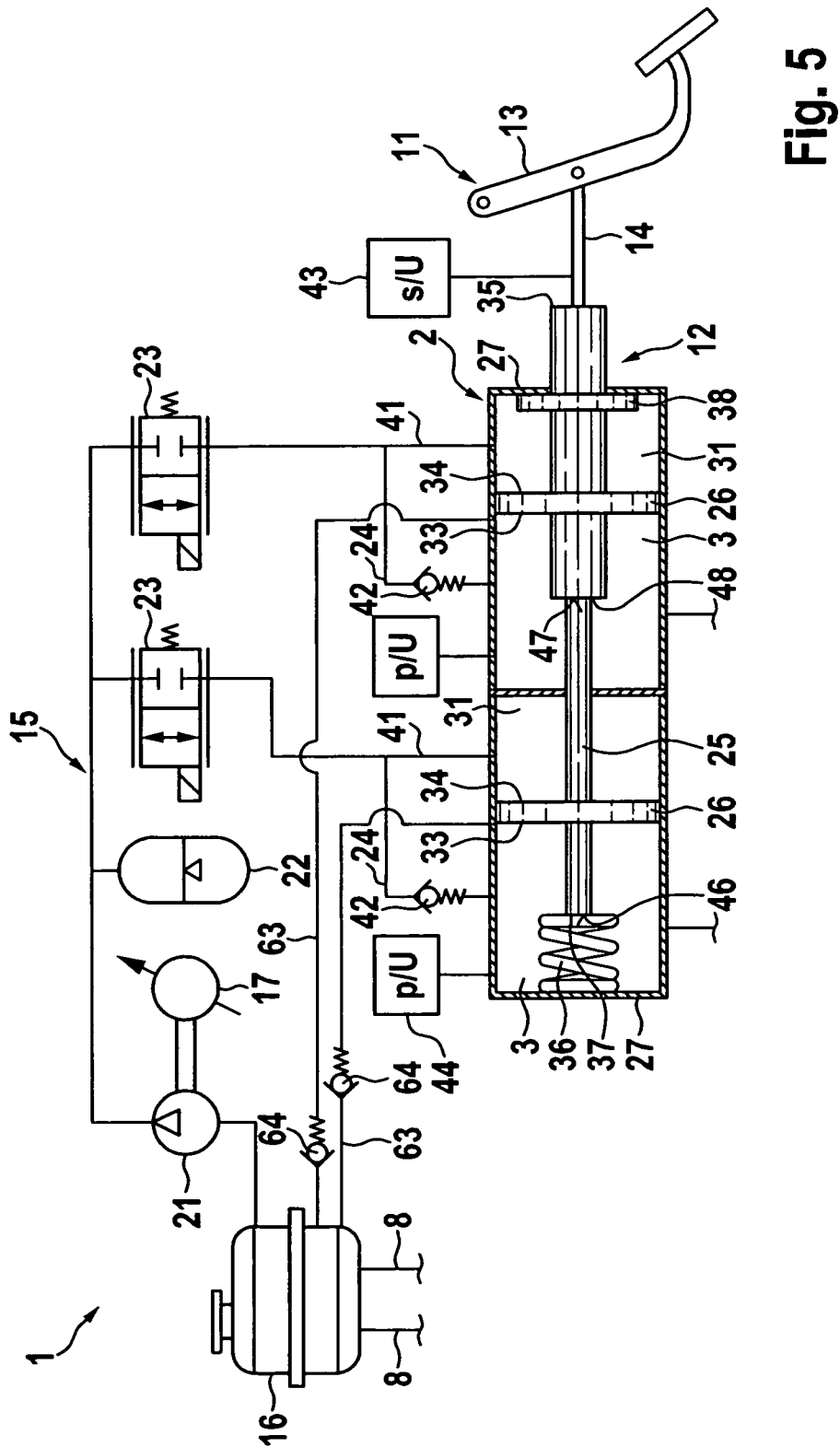
FIG. 5 schematically shows an alternative embodiment compared to FIG. 1, having a sniffing line and a check valve.

FIG. 5 schematically shows an alternative embodiment compared to FIG. 1, having a sniffing line 63 and a check valve 64.

Sniffing line 63 connects first chamber 3 to tank 16 via check valve 64. Check valve 64 only allows hydraulic fluid to continue to flow from tank 16 into first chamber 3 and not vice versa, i.e., from first chamber 3 into tank 16.

Thus, when control valves 23 are closed, i.e., in the absence of current, and a fairly large volume of hydraulic fluid is required in the brake circuit, for example when the brake linings are worn, the volume of hydraulic fluid which is lacking may be provided from tank 16 into first chamber 3 via sniffing line 63 and check valve 64.

In other respects, the exemplary embodiments according to FIG. 1 and FIG. 5 are the same.

Figure 6:
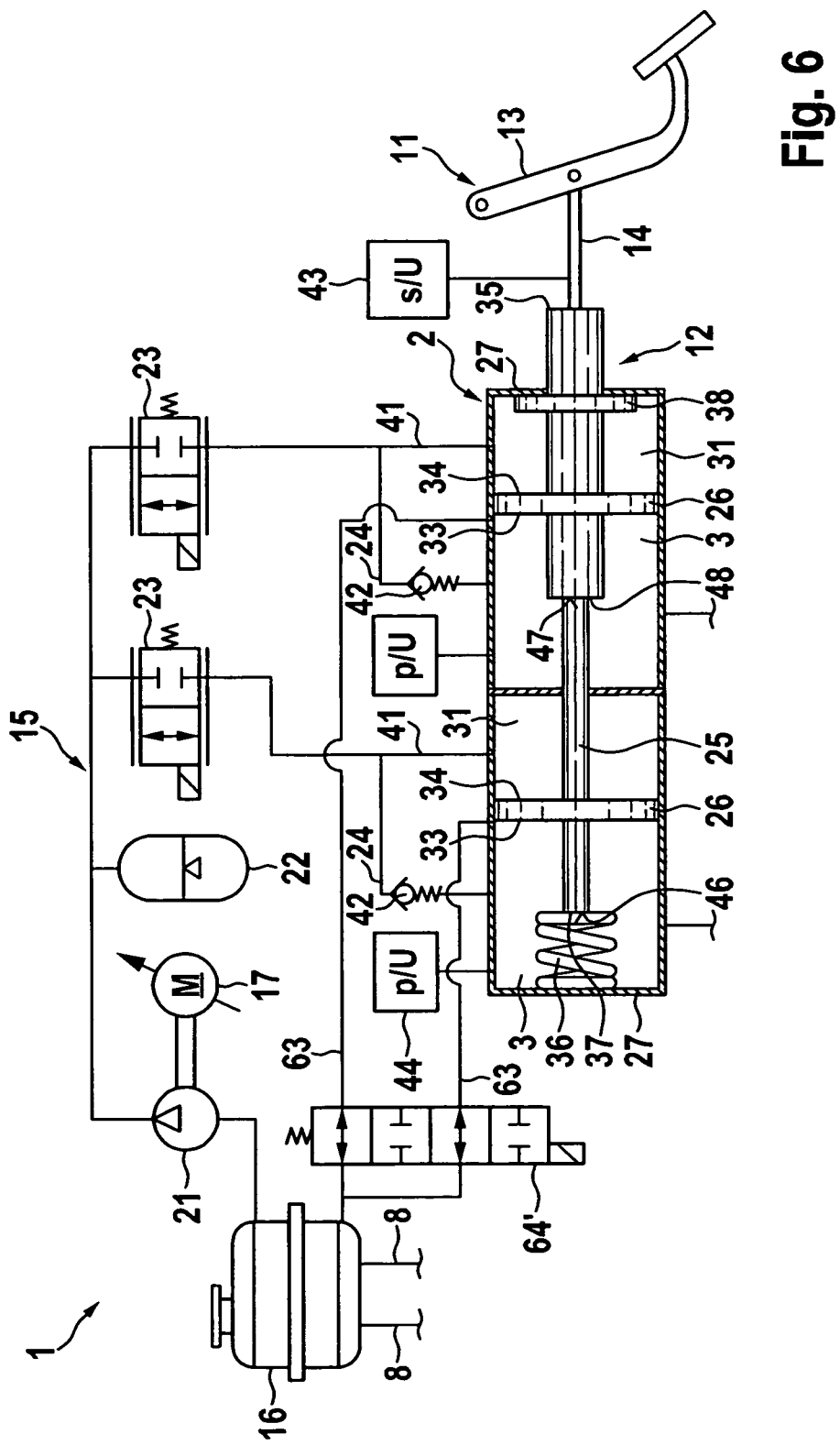
FIG. 6 schematically shows an alternative embodiment compared to FIG. 5, having a 4/2-way valve.

FIG. 6 schematically shows an alternative embodiment compared to FIG. 5, having a 4/2-way valve 64'.

4/2-way valve 64' is provided in the open position in the absence of current, and is controlled in such a way that it closes when a driver braking signal is detected, or when braking takes place independently of the driver, for example in an ESP mode. Otherwise, 4/2-way valve 64' is open, and allows hydraulic fluid to continue to flow from tank 16 into first chamber 3, and thus carries out the same function as check valve 64 from FIG. 5.

Due to the motion of piston 12 and the position of the connection of line 63 to cylinder housing 27, first chamber 3 and second chamber 31 are hydraulically connected to tank 16 in alternation via line 63 and 4/2-way valve 64'. As a result of 4/2-way valve 64' being open in the absence of current, the driver may easily push piston 12 through, for example if the vehicle electrical system fails and 4/2-way valve 64' is therefore not supplied with power.

This is because, in the present case, hydraulic fluid continues to flow from tank 16 through 4/2-way valve 64' and into second chamber 31, thus enabling motion of piston 12.

Of course, another valve may be used instead of 4/2-way valve 64'.

Although the present invention has been specifically described herein based on exemplary embodiments, it is not limited thereto, and may be modified in various ways. It is further noted that use of "a/one" herein does not exclude a plurality.

What is claimed is:

1. A brake system for a vehicle, comprising:
    a main brake cylinder having a first chamber hydraulically connected to at least one wheel brake cylinder for braking a wheel of the vehicle;
    an activating device adapted to be acted on by a driver of the vehicle, wherein in response to being acted on by the driver, the activating device acts on a piston of the main brake cylinder in order to pressurize hydraulic fluid in the first chamber of the main brake cylinder; and
    a pressure generating device hydraulically connected to the first chamber of the main brake cylinder, wherein the pressure generating device supplies the wheel brake cylinder with hydraulic fluid through the first chamber of the main brake cylinder to activate the wheel brake cylinder independently of a force from the driver as applied to a brake pedal during a first mode of operation, wherein the piston of the main brake cylinder has a separating element provided in a floating manner on a rod element of the piston, and wherein a first side of the separating element delimits the first chamber and a second side of the separating element delimits a second chamber of the main brake cylinder, and wherein the second chamber has a closed design and is filled with hydraulic fluid.

2. The brake system as recited in claim 1, wherein the rod element of the piston of the main brake cylinder has a shoulder in order to adjust a reaction force acting on the driver of the vehicle.

3. A brake system for a vehicle, comprising:
    a main brake cylinder having a first chamber hydraulically connected to at least one wheel brake cylinder for braking a wheel of the vehicle;
    an activating device adapted to be acted on by a driver of the vehicle, wherein in response to being acted on by the driver, the activating device acts on a piston of the main brake cylinder in order to pressurize hydraulic fluid in the first chamber of the main brake cylinder; and
    a pressure generating device hydraulically connected to the first chamber of the main brake cylinder, wherein the pressure generating device supplies the wheel brake cylinder with hydraulic fluid through the first chamber of the main brake cylinder to activate the wheel brake cylinder,
    wherein:
        the piston of the main brake cylinder has a separating element fixedly connected to a rod element of the piston, and wherein a first side of the separating element delimits the first chamber and a second side of the separating element delimits a second chamber of the main brake cylinder, and wherein the pressure generating device is hydraulically connected to the second chamber,
        the pressure generating device has a pump configured to pump hydraulic fluid from a tank into a pressure accumulator, and
    due to the motion of the piston, the first chamber and the second chamber are hydraulically connected to the tank in alternation via a second connection line and a second valve, the second valve being open in the absence of current in order for hydraulic fluid to continue to flow from the tank into the first chamber, and for hydraulic fluid to flow from the second chamber into the tank.

* * * * *